United States Patent [19]
Fullam et al.

[11] Patent Number: 6,148,077
[45] Date of Patent: Nov. 14, 2000

[54] SYSTEM AND METHOD FOR PROVIDING USER FEEDBACK TO COUPLE AN ELECTRONIC DEVICE WITH A TELEPHONE HANDSET

[75] Inventors: Scott Fullam, Mountain View; Zongbo Chen, Sunnyvale, both of Calif.

[73] Assignee: Pocket.com, Inc., Santa Clara, Calif.

[21] Appl. No.: 09/140,313

[22] Filed: Aug. 26, 1998

[51] Int. Cl.[7] .................................................. H04B 17/00
[52] U.S. Cl. ........................... 379/387; 379/396; 379/444
[58] Field of Search ................................ 379/88.13, 387, 379/396, 443, 444, 93.05, 93.17; 455/566

[56] References Cited

U.S. PATENT DOCUMENTS

| | | | |
|---|---|---|---|
| 5,528,663 | 6/1996 | Locke et al. ................................ | 379/31 |
| 5,950,139 | 9/1999 | Korycan .................................... | 455/566 |
| 6,023,779 | 2/2000 | Fullam et al. ............................ | 714/751 |

*Primary Examiner*—David R. Hudspeth
*Assistant Examiner*—Susan Wieland
*Attorney, Agent, or Firm*—Gray Cary Ware & Freidenrich LLP

[57] ABSTRACT

A system and method for providing user feedback for coupling the speaker and microphone of a communications device with the mouthpiece and earpiece of a telephone handset is provided in which the device may indicate to the user when a poor coupling exists causing a poor signal quality value to be generated. The system may provide feedback to the user, which may be visual or audible, so that the user may correct the interface between the communications device and the telephone handset until a predetermined quality signal is generated indicating that communications may occur between the communications device and the telephone handset.

43 Claims, 7 Drawing Sheets

SYSTEM AND METHOD FOR PROVIDING USER FEEDBACK TO COUPLE AN ELECTRONIC DEVICE WITH A TELEPHONE HANDSET

BACKGROUND OF THE INVENTION

This invention relates generally to a system and method for communicating electronic data, and in particular to a system and method for communicating electronic data in which a portable electronic device transmits data over a telephone line to a central message distribution system.

Prior to the proliferation of computers, people communicated store-and-forward style messages (i.e., messages that are first stored in some manner and then later forwarded) using facsimile machines and direct computer-to-computer data connections over existing and leased telephone lines. As computers became cheaper and easier to use, people began using more advanced facsimile machines, computer facsimile modems, and direct computer-to-computer modem connections to transfer information between each other.

More recently, people began to use commercial on-line services to communicate large amounts of store-and-forward style information (i.e., electronic mail) with each other. Now, a new medium for communicating, the Internet, has attained general public popularity. In the last five years, the number of people connected to the Internet has increased because the Internet allows users who have an Internet account, a modem, and a computer to communicate great amounts of information with each other, regardless of each party's method of accessing the Internet or the geographic location of their Internet access point, at minimal expense. For example, for the cost of a local telephone call, a person in California can send a long electronic mail (e-mail) message to a friend (who also must have Internet access) anywhere in the world. Due in large part to the Internet, the popularity of electronic store-and-forward messaging, such as e-mail, has increased exponentially.

Initially, due to the large size of computers, people typically only accessed the Internet from a desktop computer. Later, as the size and weight of computers decreased from desktops to notebooks to palmtops, people carried their computer with them wherever they went and accessed their e-mail account from any location where they could locate an RJ-11 telephone jack to connect, via modem, to the Internet. At the same time that e-mail was increasing in popularity, paging technology was also increasing in popularity. Many people today carry pagers to ensure that others can easily reach them at any time. In addition, a new product category of portable computer, known as a personal digital assistant (PDA) was introduced. The PDA's are basically very small handheld computers (several of which offer limited messaging capabilities, such as paging or e-mail) that are priced too high (i.e., in excess of $500) for purchase by the average consumer and do not offer communication features well-tailored to the average consumer user's needs.

Therefore, it is desirable to provide a handheld device to communicate electronic data through a telephone handset acoustically because it permits access anywhere a handset is located and does not require a RJ-11 telephone jack. However, in order to accurately communicate electronic data over a telephone line using acoustic coupling technology, a microphone and speaker on the handheld computer device must be properly aligned (interfaced) with the speaker and microphone, respectively, of a telephone handset. This coupling of the handheld device and the telephone handset is complicated by the fact that different types of telephones, such as typical pay telephones, cordless phones and analog or digital cellular phones, have different placements of the speaker and the microphone. Thus, it is often necessary, but difficult, to manually align the speaker and microphone of the handheld computer device with the microphone and speaker of the telephone handset. In the event of a misalignment of the speaker and microphone of the device with microphone and speaker, respectively, of the telephone handset which causes poor acoustical coupling, the acoustical signals embodying the electronic data may be garbled or completely lost, necessitating the retransmission of the electronic data.

Thus, there is a need for a system and method for providing feedback to the user of the device to permit the user to establish a better acoustical coupling between the device and the telephone handset and it is to this end that the invention is directed.

SUMMARY OF THE INVENTION

The invention provides a system and method for providing feedback to a user to permit the user to properly align the speaker and microphone of an electronic data communicator device with the speaker and microphone of a conventional telephone handset in order to acoustically communicate data from the device through the telephone handset. The interfacing of the electronic device and telephone handset may be obtained using a variety of different telephone handsets, such as a typical pay telephone handset, a cordless telephone handset or an analog or digital cellular telephone handset.

In one aspect of the invention, the system may use a sidetone signal which is normally present in a telephone circuit and permits a person using the telephone to hear their own speech in the telephone speaker during a conversation. In particular, the electronic data communicator device may emit a signal from its speaker into the microphone of the handset which is communicated over the sidetone to the handheld device's microphone which receives the signals. The signal received by the microphone should correspond to the signal originally emitted by the speaker of the handheld device. Based on a characteristic of the received signal (e.g., its strength or signal to noise ratio) the electronic data communicator device may visually or audibly indicate the alignment of the speaker and microphone of the device with the microphone and speaker, respectively of the telephone handset to the user using a signal quality indicator. The signal quality indicator may be, for example, one or more light emitting diodes (LEDs) in which for example, fewer lit LEDs would indicate a weaker signal. The signal quality indicator may also be a visual image which is displayed or an audible signal. As the user moves the speaker and microphone of the electronic data device into better alignment with microphone and speaker of the telephone handset, the signal quality indicator would change so that the user may move the telephone handset or the electronic data device until the signal quality indicator is at a maximum value indicating the best alignment of the speaker and microphone of the device with the microphone and speaker of the telephone handset and therefore the best acoustic coupling. In this embodiment of the invention, the electronic data communicator device does not require a connection to the server in order to perform the alignment.

In accordance with another aspect of the invention, the electronic data communicator device may establish a connection with a remote server through a telephone handset and generate a known signal. The server may then echo the signal back to the handheld device. The signal echoed by the server may be shifted to a different frequency or altered in some way so that the sidetone signal would not affect the signal. For example, the handheld device may generate a signal at a first frequency and then the server may send back a signal at a second frequency to avoid any problem with the sidetone. Based on a characteristic of the signal, such as its strength or signal-to-noise ratio, fed back from the server, an alignment indicator indicates a current signal quality so that the positioning of the speaker and microphone of the electronic data communicator device with respect to the microphone and speaker respectively, of the telephone handset may be adjusted as described above. In this embodiment, the electronic data communicator communicates with the server to establish the proper interface between the device and the telephone handset. This interface process with the server may also occur in a half duplex mode.

The visual signal quality indicators may indicate a proper interface in several different ways. For example, the LEDs on the outside of the electronic data communicator may be extinguished until a proper interface is obtained or one or more of the LEDs may be flashed until a proper interface is obtained at which time the LEDs are constantly illuminated.

In accordance with another aspect of the invention, a connection between the server and the handheld unit may be established and then the server may generate an audible signal which provides the user with an indication of whether a proper interface has been achieved. For example, if the user of the handheld unit does not hear any sound from the speaker of the handheld unit, then the positioning is bad and must be adjusted by the user. While the user is adjusting the positioning, a particular audible signal is heard and then when the proper interface has been obtained, the server may either generate a unique signal or automatically begin receiving data from the electronic data communicator.

In accordance with the invention, a method and system for providing user feedback to couple a speaker and a microphone of a communicator device with a mouthpiece and an earpiece, respectively, of a telephone handset is provided in which an audible signal is received by the device and the device generates a signal indicating the quality of the signal received. The device then indicates, either visually or audibly, to the user when the proper coupling of the device and the telephone handset has been achieved based on the signal quality.

BRIEF DESCRIPTION OF THE INVENTION

DETAILED DESCRIPTION OF A PREFERRED EMBODIMENT

The invention is particularly applicable to a system and method for providing user feedback in order to couple an electronic data communicator with an typical telephone handset. It is in this context that the invention will be described. It will be appreciated, however, that the system and method of the invention has greater utility, such as to other systems that require such a coupling and to other types of telephone handsets, such as cordless telephones as well as analog and digital cellular telephones. To better understand the invention, an example of a communications system which may use the user feedback system in accordance with the invention will now be described. It should be understood that the invention, however, may be used with any communications system which connects two computers over a telephone line using a telephone handset.

An example of an electronic messaging system may include a central computer, and a hand-held, portable, battery powered unit. The unit may be located remotely from the computer and may generate, transmit and/or receive electronic messages, such as pager, facsimile, and e-mail messages, over a first communications link to the computer, and may also receive incoming messages from the computer over a second communications link. The remote unit may also have a display device and an input device for creating and viewing messages. In addition, the remote unit may have an acoustic coupling system so that signals from the remote unit may be acoustically coupled to and communicated through the first communications link. The computer of the electronic messaging system may receive the incoming remote unit electronic messages, may detect and correct errors in remote unit signals, and may transmit an audible signal or electronic signal back to the user of the remote unit, over the first communications link, indicating receipt of the remote unit signals. The computer may also transmit the various types of electronic messages from the remote unit (i.e., e-mail, pager, and facsimile) over various appropriate outputs, and may transmit messages back to the remote unit over a second communications link. In another embodiment, the remote unit, which may be referred to as a communicator device, may have a single communications link over which electronic data is both received as well as transmitted. The user feedback system, as described below, is not limited to any particular type of communicator device and may be used with a variety of devices which communicate data between a handheld device and another computer acoustically through a telephone handset. An example of the remote unit will be briefly described below but a complete description may be found in co-pending and co-owned U.S. patent application Ser. No. 08/588,165 filed Jan. 18, 1996 which is incorporated herein by reference.

Figure 1:
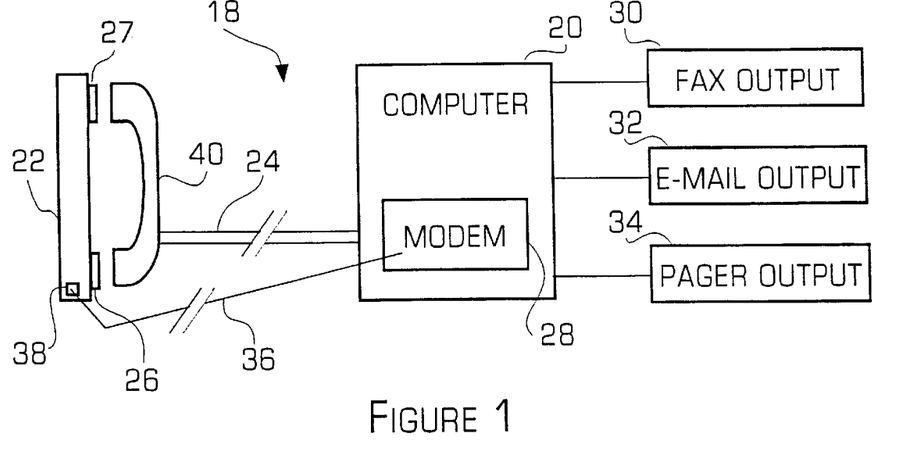
FIG. 1 is a diagram depicting an example of an overall system and method for communicating electronic data between a handheld unit and a server over a telephone line.

FIG. 1 is a schematic diagram of an electronic multi-function messaging system 18. As shown, the electronic messaging system 18 may include a computer 20, and a portable unit 22 remote to the computer. A first communications link 24, such as an ordinary telephone line, may connect the remote unit 22 to the computer 20 to permit the communication of messages from the remote unit to the computer using either a one-way or a two-way communications protocol. The remote unit preferably generates acoustic tone patterns (V.23 CCITT originating station modem tone frequencies to indicate a serial 1/0 bit stream) representing various types of electronic messages created by a user. In the one-way protocol, the acoustic tones may be output by an output device 26, such as a speaker, and transmitted over the first communications link to the computer, which interprets the tones from the remote unit using a data receiver modem 28. The computer may detect and correct errors in the data, as described below, sent to it by the remote unit, and may generate an audible signal that is sent back to the user of the remote unit over the first communications link. The signal may indicate a sufficiently error-free data transmission or may indicate that the data must be resent because the transmission is not sufficiently error-free. In the two-way protocol, a microphone 27 of the handheld device may also be coupled to the telephone handset so that the computer may transmit acoustical tones back to the remote unit to acknowledge each packet of data.

The computer may separate out the individual types of messages according to their ultimate destination (i.e., facsimile, e-mail, and pager messages), and send those messages to the appropriate sub-system within the computer that transmits the messages (i.e., a facsimile machine subsystem for transmission of facsimile messages). In the system shown in FIG. 1, the computer may have a facsimile output 30, an e-mail output 32 and a pager output 34. The multi-function electronic messaging system according to the present invention may process any other type of electronic messages and may also have additional types of functions, such as a voice messaging system. The computer may also send incoming electronic messages to the remote unit over the first communication link in a two-way communications protocol and/or over a second communications link 36, as will be described below.

The computer may also detect faulty pager messages or pager messages not received by the handheld unit, based on a telephone session with the handheld unit, and the computer may re-transmit those lost pager messages either over the pager frequency or over the telephone link. The computer may also permit the user to customize his communications with the computer so that the computer may provide additional information to the user about the origin of an incoming message. For example, the computer may receive an incoming facsimile message for a user and may retrieve, from a copy of the user's address book stored on the computer, the sender of the facsimile message and determine the sender's facsimile number so that the user may easily respond to the facsimile message. The computer may then attach the sender's facsimile number to the facsimile message and transmit both to the user over one of the communications links. Therefore, when the user receives the message, he will may the return facsimile number so that he can respond without having to look up the facsimile number in his address book. The computer may also attach a person's phone number to an incoming voicemail message so that the user may more easily respond to the message.

The user may also request that a complete copy of the data stored in the handheld unit is periodically stored on the computer. For example, an address book and any saved messages may be stored on the computer. In the event that the handheld unit loses its data due to low battery power, the data may be restored to the handheld unit from the copy stored on the computer. In addition, if a user loses his handheld unit or the handheld unit is stolen, the user may purchase a new handheld device and restore all of his data from copy of the data stored on the computer.

In this embodiment, the second communications link may be a wireless pager frequency link. To receive the incoming pager messages, the remote unit may have a pager receiver 38. In addition, the first communications link may be a pay telephone line with a receiver handset 40, and the remote unit speaker is held against the telephone handset microphone to couple the acoustical tones to the telephone line. The first and second communications links may be any type of communications link, and are not limited to the examples shown in FIG. 1. In another embodiment, the remote unit 22 may have a single acoustical communications link over which data is communicated between the central computer and the handheld unit using tone patterns.

Figure 2:
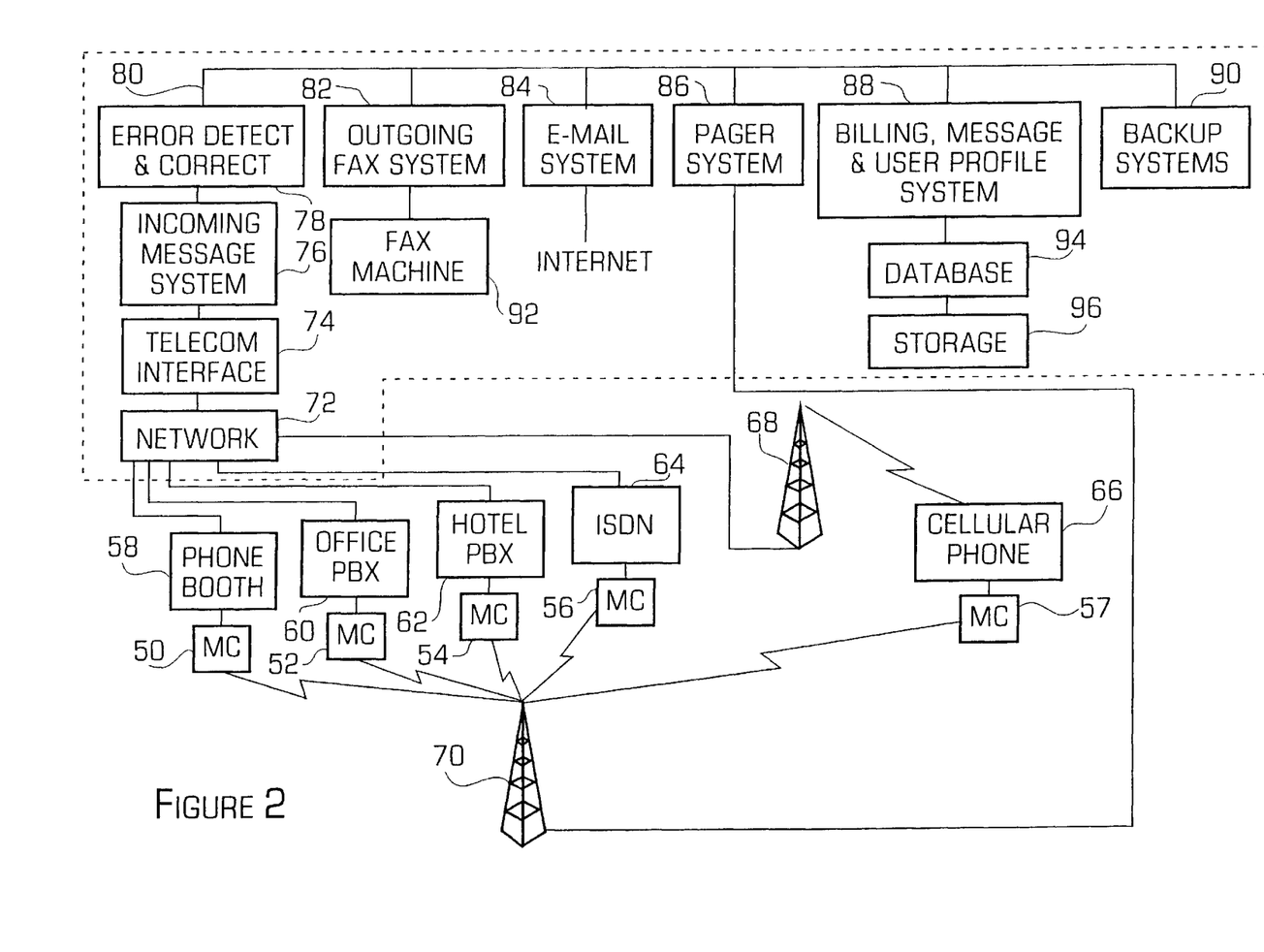
FIG. 2 is a diagram depicting a plurality of handheld units communicating data with a server.

FIG. 2 is a block diagram of the computer 20 connected to a plurality of remote units 50, 52, 54, 56 and 57. The remote units may be connected to the computer, as shown, through a variety of different first communication links, such as a public telephone line 58, an office private branch exchange (PBX) 60, a hotel telephone switchboard and branch exchange 62, an ISDN link 64, or a cellular telephone link 66 through a cellular base station 68. In addition, as described above, the remote units may also have a built-in or external pager radio receiver (not shown), so that the remote units may receive incoming pager messages over the second communications link, such as radio pager system 70. All of the remote units attached to the different first communications links, are connected to the computer by a Public Switched Telephone Network (PSTN) 72 that may handle a plurality of telephone calls from remote units by switching the calls to various incoming telephone lines and a plurality of modems (not shown) in the computer. The modems may be connected to a telecommunications interface 74 of the computer that interprets and translates (converts) the incoming acoustical tones from the remote units into electronic digital form. The telecommunications interface may then forward the converted incoming remote unit data to an incoming message system 76 that processes the incoming data from the remote units. The detection and correction of errors in the data may be performed by an error detection and correction system 78. The error-corrected messages may be routed to the appropriate outgoing message systems, as described below. All of the computer systems may include microprocessors or multi-tasking computer servers and may be connected together by a backbone network 80, such as an Ethernet network, so that all of the systems within the computer may exchange data with each other. In this embodiment, the outgoing message systems shown are an outgoing facsimile system 82, an e-mail system 84, and a pager system 86. A billing, message and user profile system 88, and a backup system 90 may also be connected to the backbone 80. The invention is not limited to the outgoing systems shown and may have other systems, such as a voicemail system.

If some of the data received by the incoming message system 76 is a facsimile message, then the message may be first error detected and corrected in the error detection and correction unit 78 and then routed over the backbone network 80 to the outgoing facsimile system 82, that may have a facsimile machine 92 or server attached to it for sending outgoing facsimile messages. If some of the data received by the incoming message system is an outgoing electronic mail (e-mail) message, the message may be error-corrected and routed to the e-mail system 84, and then over an electronic mail channel, such as the Internet. For an incoming e-mail message to the remote unit user, the e-mail message is received by the e-mail system and routed in a one-way protocol to the pager system 86, which sends the message to the remote unit through a paging terminal and transmitter 70 in the form of a pager message. In a two-way protocol, the incoming message may be communicated over the first communications link to the remote unit. Thus, there are two different ways to transmit messages to the remote unit. If some of the data received by the incoming message system is an outgoing pager message, then the message may be routed to the pager system 86 that is connected to the paging terminal and transmitter 70.

The billing, message and user profile system 88 may store all of the information necessary to keep track of billing, message usage, and user profiles. The billing, message and user profile system may also have a database 94 and an archival storage device 96, for short term and long term storage, respectively, of the user profiles and billing information. The database also stores audible messages (i.e., prerecorded voice messages) that may be sent to the user of the remote unit user over the first communications link (i.e., as an acknowledgment that data from the remote unit has been properly received). The back-up system 90 may include a back-up facsimile system, a back-up e-mail system, a back-up pager system, a back-up incoming Message system and a back-up billing, message and user profile system that are all connected together by a back-up network. The details of the back-up system are not shown. This back-up system provides redundancy within the computer to reduce lost data due to crashes and other possible malfunctions and mishaps. Now, an example of the handheld unit which may include the user feedback system in accordance with the invention will be described in more detail.

Figure 3:
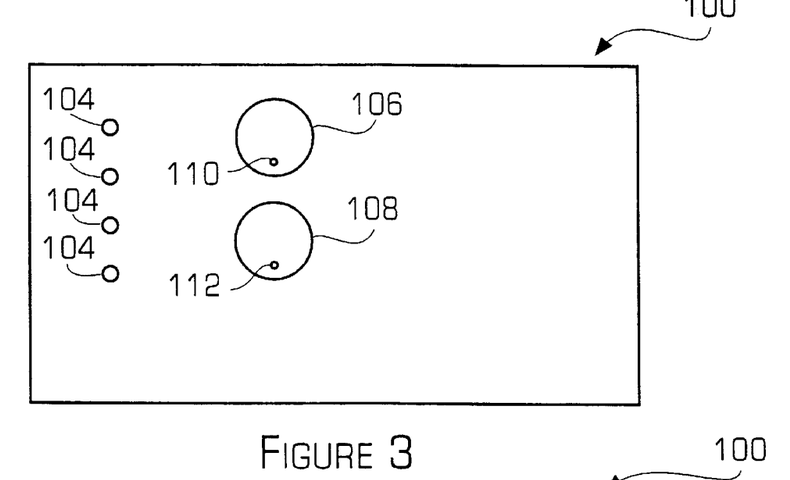
FIG. 3 is a top view of a handheld unit closed position.
Figure 5:
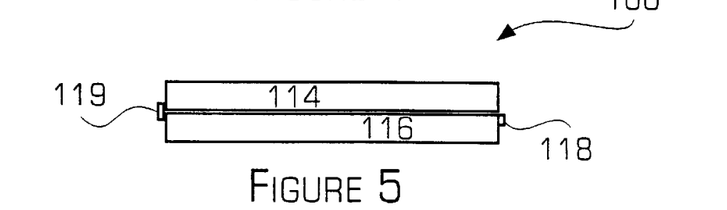
FIG. 5 is an end view of a closed handheld unit.
Figure 6:
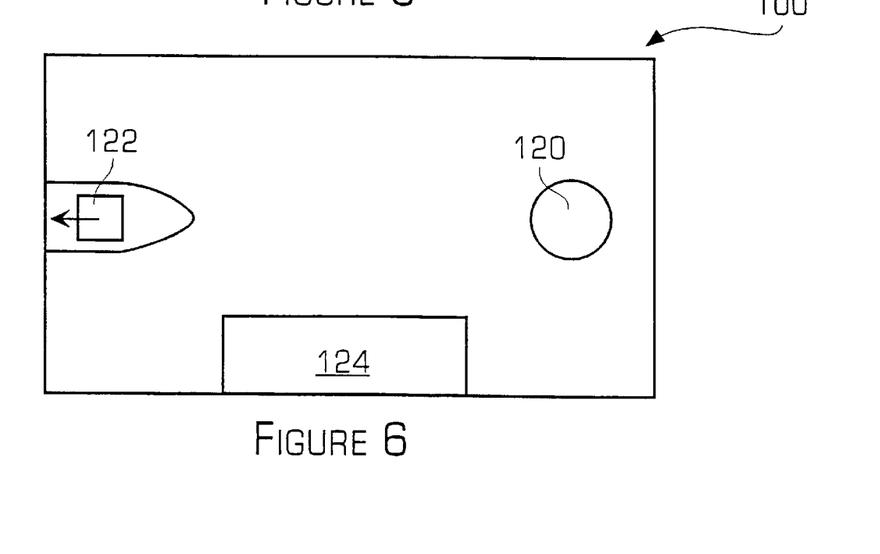
FIG. 6 is a bottom view of a closed handheld unit.
Figure 7:
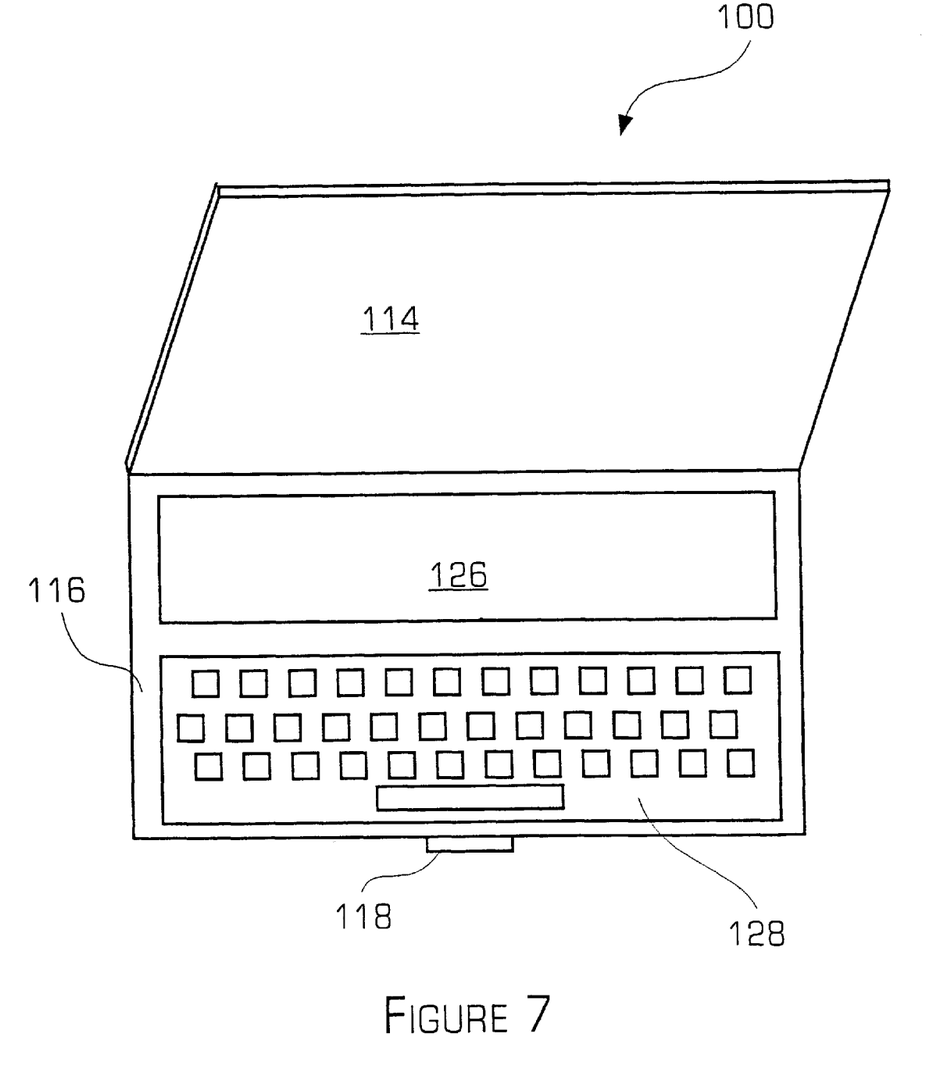
FIG. 7 is a top view of a handheld unit in a open position.

FIGS. 3–6 are top, side, end, and bottom views, respectively, of a closed handheld unit and FIG. 7 is a top view of an open handheld unit. A handheld unit 100 may be sized such that the handheld unit fits easily into a pocket for convenient carrying. As shown in FIG. 3, when the handheld unit 100 is closed a top surface of the case 102 is viewed and the top surface of the case may include a plurality of light emitting diodes (LED's) 104 and two buttons 106, 108. Each button may have an LED 110, 112 associated with the button. The LED's 104 and the buttons 106, 108 permit the handheld unit to be operated with the case closed, as will be described below. The LED's 104 may indicate, for example, the length of time required for the transmission of messages to the handheld unit or the alignment of the speaker and microphone of the unit with the microphone and speaker of the telephone handset, as described below. The first button 106 may permit the user of the handheld unit to select a "Send-only" mode of operation as described below. The LED 110 will illuminate to indicate that the messages are being received by the handheld unit. The second button 108 may permit the user to select a Send/Receive mode of operation and the LED 112 may illuminate to indicate that the messages are being received by the handheld unit. These two buttons permit a user to operate the handheld unit without opening the case. Thus, a user may want to quickly check his messages may do so by simply holding the speaker of the handheld unit up to the telephone handset and depressing the appropriate button, as will be described below in more detail.

In order to ensure that a user of the handheld unit can determine that an active communications session between the handheld unit and the server is occurring, the handheld unit may have an audio transducer. During an active communications session, the audio transducer may emit a constant beeping sound so that, even if the user cannot hear the acoustical data due to high background noise, the user may confirm that communications session is occurring.

Figure 4:
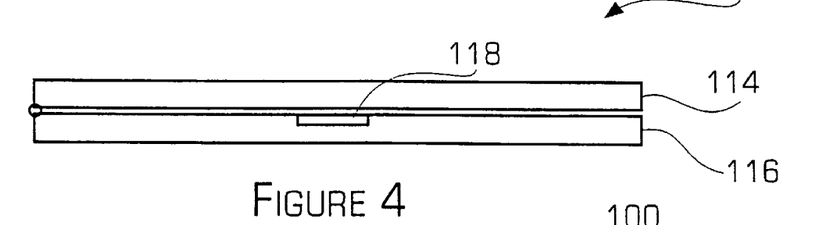
FIG. 4 is a side view of a closed handheld unit.

FIGS. 4, 5 are diagrams of a side and end view, respectively, of the handheld unit 100. As shown, the handheld unit may have an upper case 114 and a lower case 116 that may be releasably closed by a latch 118. The handheld unit may also have a hinge 119 that connects the upper and lower cases. As shown in FIG. 6, the bottom of the handheld unit may also have a speaker 120 and a microphone 122. The speaker and the microphone may be separated by a distance on the handheld unit such that the speaker and microphone may acoustically couple to the earpiece and mouthpiece, respectively, of a telephone. The microphone location may be adjustable to adjust for different telephone handsets. The bottom of the handheld unit may also have a battery compartment 124. FIG. 7 is a diagram of the handheld unit 100 when the case is open. As shown, a display 126 and a keyboard 128 may be protected by the upper case 114 when the case is closed. Now, the handheld unit will be described in more detail.

Figure 8:
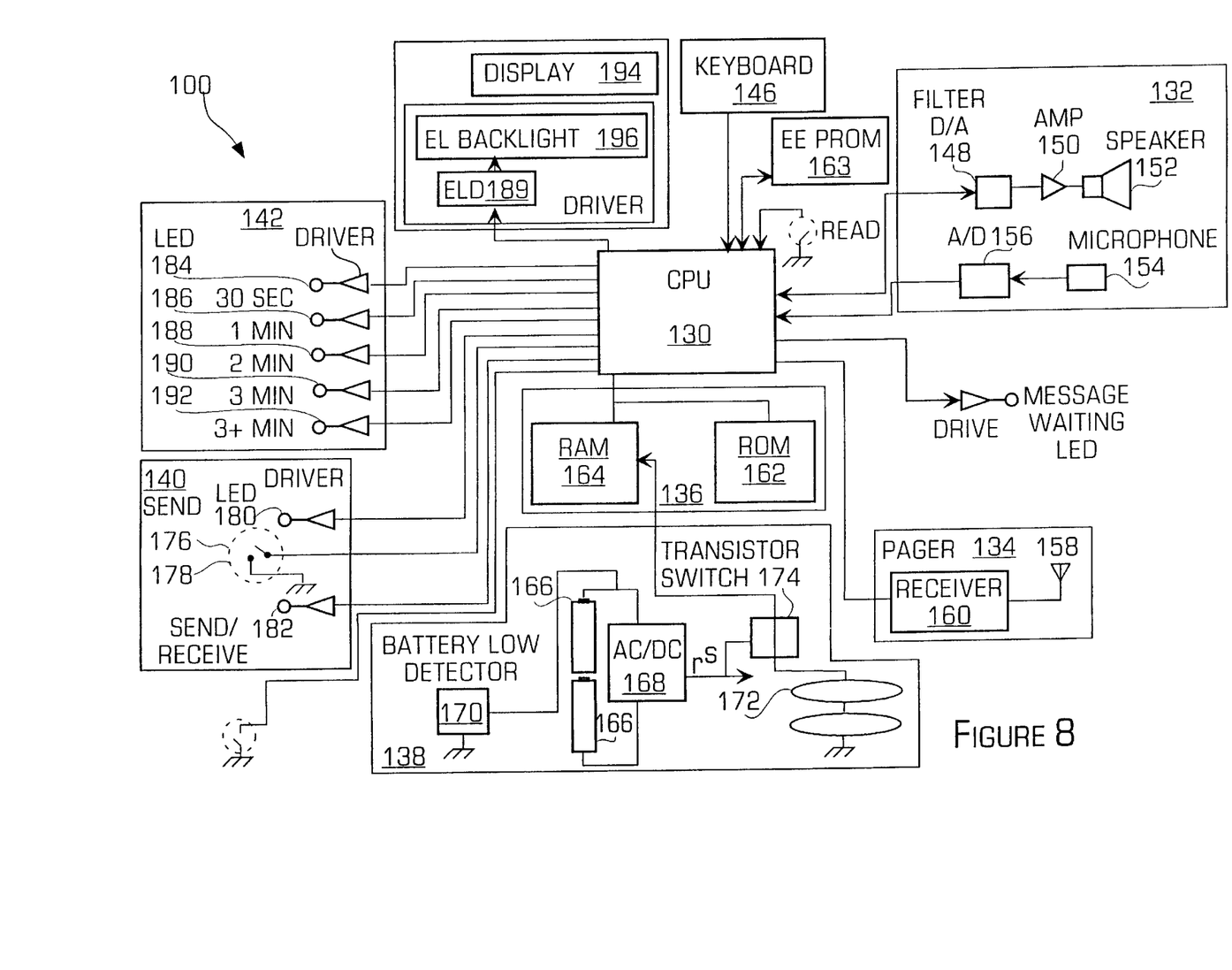
FIG. 8 is a more detailed diagram of the handheld unit.

FIG. 8 is a more detailed block diagram of the handheld unit 100. The handheld unit may include a central processor unit (CPU) 130, a communications unit 132, a pager unit 134, a memory unit 136, a battery unit 138, a mode selector 140, a communications length indicator 142, a display system 144, and a keyboard 146. The CPU may control the various other pieces of the handheld unit. The communications unit may permit the CPU and the user to send and/or receive electronic data over a telephone line, and the pager may receive data over a pager frequency. Thus, in accordance with the invention, there may be two different methods for receiving electronic data (i.e., over the telephone line or over the pager frequency). The memory may store the software application being executed by the CPU and store user data, such as addresses, appointments and the like. The battery system may provide power to the electronic messaging system and ensure that a portion of the memory always receives power in order to avoid losing the user's data, for example, when the batteries need to be changed. The mode selector may permit the user to select a send-only mode or a send/receive mode. The communication length indicators permit the user to quickly determine the time necessary to download the messages over the telephone line. The communications length indicator may also indicate to the user that he may break the communications link with the server, as described below, without any permanent loss of data. As soon as the communications length indicator has illuminated, a summary of all of the messages to be sent to the handheld unit has been received so that if the communications link is broken before all of the messages have been transferred to the handheld unit, the handheld unit may later request the messages that were not sent based on the summary. The display system displays data for the user to view, and the keyboard permits the user to enter data into the handheld unit. The keyboard may be replaced with a touch-screen and handwriting recognition software.

The handheld unit may transmit a message to the server indicating, at the start of the communication session, how much memory space remains in the handheld unit for messages. Thus, the server will only send as many messages as can fit in the memory to avoid causing the handheld unit to lose older messages. The server may also send a message to the user indicating that the user needs to remove messages before any additional messages will be transmitted from the server.

The communications system 132 will now be described in more detail. The communications system may a send electronic data using a filter/digital to analog converter (D/A) 148, an amplifier 150 and a speaker 152. The CPU may generate forward error corrected (FEC) digital pulse width modulated audio data that is converted into an analog waveform. The analog waveform may be amplified and the amplified analog signals cause the speaker to generate audio signals that may be communicated over a telephone line in accordance with the invention. To communicate the Audio signals over the telephone line, the speaker may be acoustically coupled to the telephone handset mouthpiece. The communications system may also receive FEC encoded data over the telephone line using a microphone 154 and an A/D converter 156. To receive data over the telephone line, the microphone may be acoustically coupled to the telephone handset receiver. Thus, in accordance with the invention, the handheld unit may both transmit and receive data in the form of Audio signals over the telephone line. The pager receiver will now be described.

The pager receiver 134 may provide a second way in which data may be transmitted to the handheld unit. The pager receiver may receive pager transmissions using a pager antennae 158 and a pager module 160 that converts the received pager frequency signals into data that may be routed to the CPU. Thus, with the handheld unit, the user may receive data using the two-way protocol over the telephone line or over the pager frequency, depending on the set-up selected by the user. For example, the user may select to receive a summary of his incoming messages over the pager as a pager message so that he may review and select the messages that will be downloaded to him over the telephone line, which may reduce the time needed to download the message. The user may also select to download only critical messages. The user may also select to receive his pager messages over the first communications link (i.e., the telephone link) which provides back-up to the pager receiver in the event that the pager receiver is inoperative. The user may also select to receive his messages over the pager instead of the telephone link which provides back-up to the telephone link. The handheld unit may also be operated without a pager module. Now, the memory and the battery systems of the handheld unit will be described.

The memory 136 may include a read only memory (ROM) 162, an electrically erasable, programmable read-only memory (EEPROM) 163 and a random access memory (RAM) 164. The memory 136 may also have a flash memory card (not shown) that may be added on to the handheld unit to increase the storage capacity of the handheld device. The ROM may store the applications, such as the message organizer, address book application, and the datebook, that are permanently stored within the handheld unit. The EEPROM may store data that may be changed once at the factory, such as a handheld unit's serial number that may be used by the server to identify each handheld unit. The RAM may store a user's changing data, such as address book data, sent messages, appointments and the like. Since RAM is volatile and its contents will be lost if power is lost to the RAM, the battery system 138 provides constant power to the RAM. To avoid completely losing his data, a user may back-up all of his data to the server and then, if he does lose his data, he may download his previously stored data from the server and rebuild his data on his handheld unit. The battery system 138 may provide power to the CPU and the rest of the system, but especially provides power to the RAM. The battery system may include a pair of non-rechargeable batteries 166, and a converter 168 which outputs a steady +5 volts. A low battery indicator 170 may also be included in the battery system 138. To back-up the non-rechargeable batteries, a pair of alkaline cells 172 may be included that are not used unless the non-rechargeable cells have been depleted or removed from the handheld unit. A switch 174 may switch between the non-rechargeable cells 166 and the alkaline cells 172 to ensure the power is maintained to the RAM. Now, the mode selection system 140 and the communication length indicator system 142 will be described.

The mode selection system 140, as described above, permits a user to select either a send-only mode for faster message transfer or a send/receive mode. To select either mode, the user may depress a button 176, 178 for the send mode or the send/receive mode and an LED 180, 182 associated with each button will illuminate to indicate the mode of operation selected by the user. As described above, the buttons and LED's may be located on the outside of the handheld unit so that it may be operated without opening the case. The transmission length indicator system 142, as described above, may comprise a plurality of LED's 184–192 which indicate the length of time required to receive the messages from the server. As shown, the length may be indicated to be 30 seconds, one minute, two minutes, three minutes or more than three minutes. The LED's may also indicate a percentage of time remaining in the communications session, such as 75%, 50% and 25%. In addition, once any one of the LED's has been illuminated, the handheld unit has received a condensed summary of the messages to be received by the handheld unit, as described below. Thus, if the communications link is broken prior to receiving all of the messages, the user may later request the transmission of those unsent messages based on the summary of the messages so that the user may break the communications link with the server, after the summary is received, without permanently losing any of the messages. The LEDs may also indicate a proper or bad interface of the handheld device as described below. Now, the display and keyboard will be described.

The display 144 may include a liquid crystal display (LCD) 194, an electroluminescent (EL) backlight 196 and an EL driver 198. The EL backlight may backlight the LCD so that the LCD may be viewed easily during low light conditions. The keyboard 146 may be a standard QWERTY layout keyboard. Now, the operation of the handheld unit will be described.

In operation, a user may either transmit messages to the server or receive messages from the server. To transmit messages, a user may generate a message using a keyboard and the message may be stored in the RAM. The user may then establish a telephone link with the server. The user may then hold the speaker and/or microphone of the handheld unit up to the handset of the telephone. The server may then determine whether the communication is one-way (i.e., the handheld unit sends data and the server sends voice prompts back to the user) or two-way (i.e., the handheld unit or server sends/receives packets of data and the handheld unit or server may acknowledge the receipt of each packet). The one-way and two-way mode of communication will be described below in more detail. With either one-way or two-way, the data from the handheld unit may be transmitted over the telephone line to the server. The user may then hang-up the telephone once the message transfer is complete.

To receive data from the server, the user may either receive data over the telephone line if the send/receive mode of operation has been selected, or over the pager receiver. For the pager receiver, the user may receive pager messages at any time. To receive messages over the telephone line, the user must initiate a telephone call to the server and the data will be downloaded. As described above, the server may send a pager message to the user containing a summary of the incoming messages so that the user may select to download only certain messages. Now, the automatic interface system in accordance with the invention which may be used with the system and handheld unit shown in FIGS. 1–8 will be described.

Figure 9:
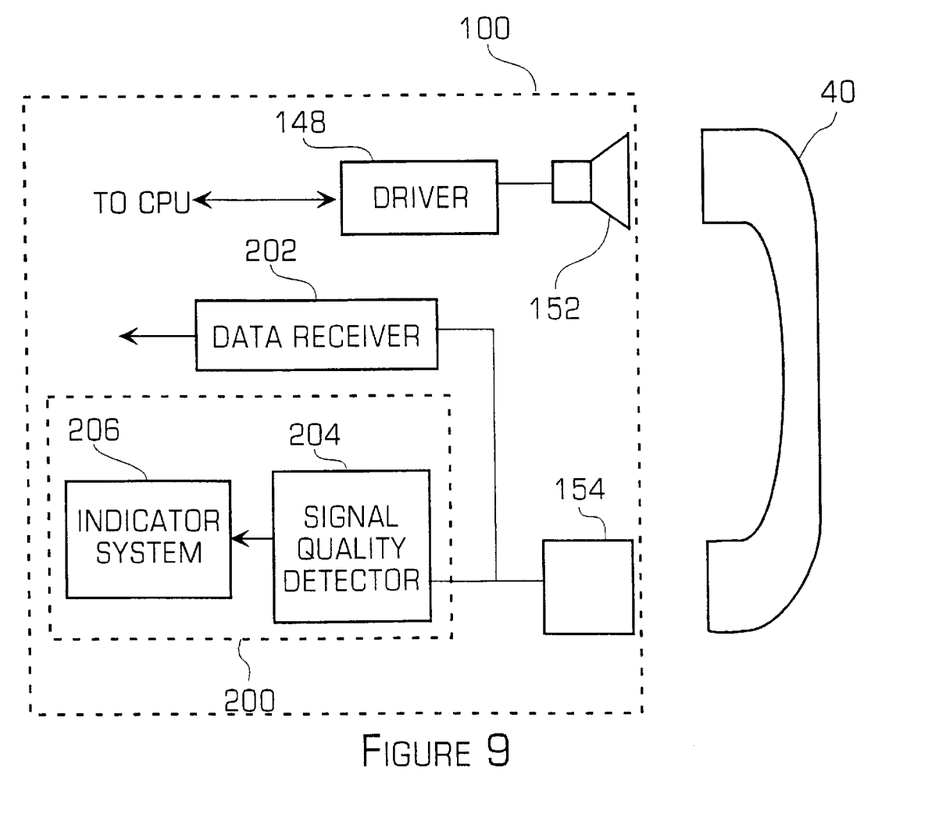
FIG. 9 is a block diagram illustrating an automatic user feedback system in accordance with the invention that may be within the handheld unit.

FIG. 9 is a block diagram illustrating an automatic user feedback coupling system 200 in accordance with the invention that may be housed in the handheld device 100. As shown, the microphone 154 of the handheld device 100 is connected to a data receiver 202 and the automatic interface system 200. During the coupling process, the incoming signal from the microphone 154 may be processed by the automatic user feedback coupling system 200 in order to determine when the speaker 152 and microphone 154 of the handheld device are properly aligned with the microphone and speaker, respectively, of the telephone handset 40. Once the proper coupling has been obtained and normal electronic data communications starts, the signals from the microphone 154 are fed into the data receiver 202, which is part of the handheld device 100. The data receiver may then process the incoming signals and generate one or more electronic messages readable by the user of the handheld device.

The automatic user feedback coupling system 200 may include a signal quality detector 204 and an indicator system 206. The signal quality detector may be any conventional hardware circuit which, based on the received microphone signal, generates an output proportional to the quality of the signal, such as the signal to noise ratio (SNR). The value of the quality signal indicates the coupling of the handset 40 and the handheld device 100 since any misalignment would contribute to the poorer quality (i.e., noise) within the signal. Thus, a higher signal quality indicated by a higher SNR value indicates a better coupling of the telephone handset and the handheld device. For example, the signal quality detector may detect the incoming microphone signal and generate a SNR value of the signal based on the incoming signal. As another example, the signal quality detector may attempt to locate a particular pattern of data in the received signal and then deliver a signal proportional to the number of errors detected in the received data. To perform these functions, a microprocessor or a digital signal processor in the handheld unit 100 may be used.

In accordance with the invention, there are several different techniques by which the signal received by the microphone 154 may be generated. In one technique, a sidetone signal of the telephone handset is utilized. In particular, all telephone handsets provide a sidetone signal which permits a user of the telephone to hear their own speech in their telephone's earpiece during a conversation. Therefore, the speaker 152 of the handheld device which is driven by the driver 148 may produce a signal (the signal may be a single tone or a known sequence of tones produced by the CPU) and the generated signal may be communicated back to the microphone 154 of the handheld device through the telephone handset 40 due to the sidetone signal. Then, the handheld device may determine the signal quality based on the signal fed back to the microphone through the sidetone. This technique does not require a telephone connection between the handheld unit and the server.

In another technique, a telephone connection may be established between the handheld device and the server, the handheld device may produce a known signal and the server may echo the signal back to the handheld device. The signal echoed back to the handheld device must be altered or frequency shifted in some manner so that the sidetone of the telephone handset does not interfere with the automatic coupling process. For example, the handheld device may generate signals at a first frequency and the server will respond using at a second frequency. In yet another technique, a half duplex mode may occur in which the handheld device sends a signal and then the server echoes the signal back to the handheld device.

Once the signal quality (e.g., SNR value or the number of errors) is detected, the output of the signal quality detector 204 may be used to drive an indicator system 206 which may indicate to the user of the handheld device that the coupling of the device to the telephone handset needs to be adjusted by the user and/or indicates that the coupling between the handheld device and the telephone handset is proper. Thus, the automatic coupling system will indicate to the user if there is any misalignment so that the user may correct the misalignment to ensure a good communications link. The indicator system 206 may provide either visual or auditory signals. If the indicator system is visual, then the output of the signal quality detector 204 may be used to illuminate, for example, the LEDs 184–192 of the handheld device. For example, for a visual indicator, the LEDs may be off until a proper coupling is detected and then the LEDs are illuminated, the LEDs may be flashed and then switched on when a proper coupling has been obtained, or the handheld device may automatically start a data communications session with the LED being illuminated to indicate message length whenever a proper coupling has been obtained. The device may also generate a graphical image indicating the proper or misalignment of the device and the telephone handset.

For an indicator system using audible indicators, the server may send a signal having a pre-agreed pattern to the handheld device which is received by the microphone 154. If the user of the handheld device does not hear any sound, it indicates that the coupling between the handheld device and the telephone handset is improper and needs to be corrected by the user. If the coupling is proper, the handheld device will recognize the signal with the pre-agreed pattern sent from the server and the handheld unit can send a signal having the pre-agreed pattern back to the server which is heard by the user.

In another embodiment, the handheld device may initially generate a pseudorandom signal and search for the server's acknowledgment pseudorandom signal in order to determine if the proper coupling of the handheld device and the telephone handset has been achieved. In this embodiment, the user will continue to hear a noise of the pseudorandom signal until the proper coupling has been obtained and then the normal data communications session may be started. The audible indicator system has the advantage that, if the coupling is proper the first time it is checked by the coupling system, the time spent by the automatic coupling system on the automatic coupling process is unnoticeable by the user of the handheld device and the data communications session starts quickly. Now, a method for automatic user feedback coupling in accordance with the invention will be described.

Figure 10:
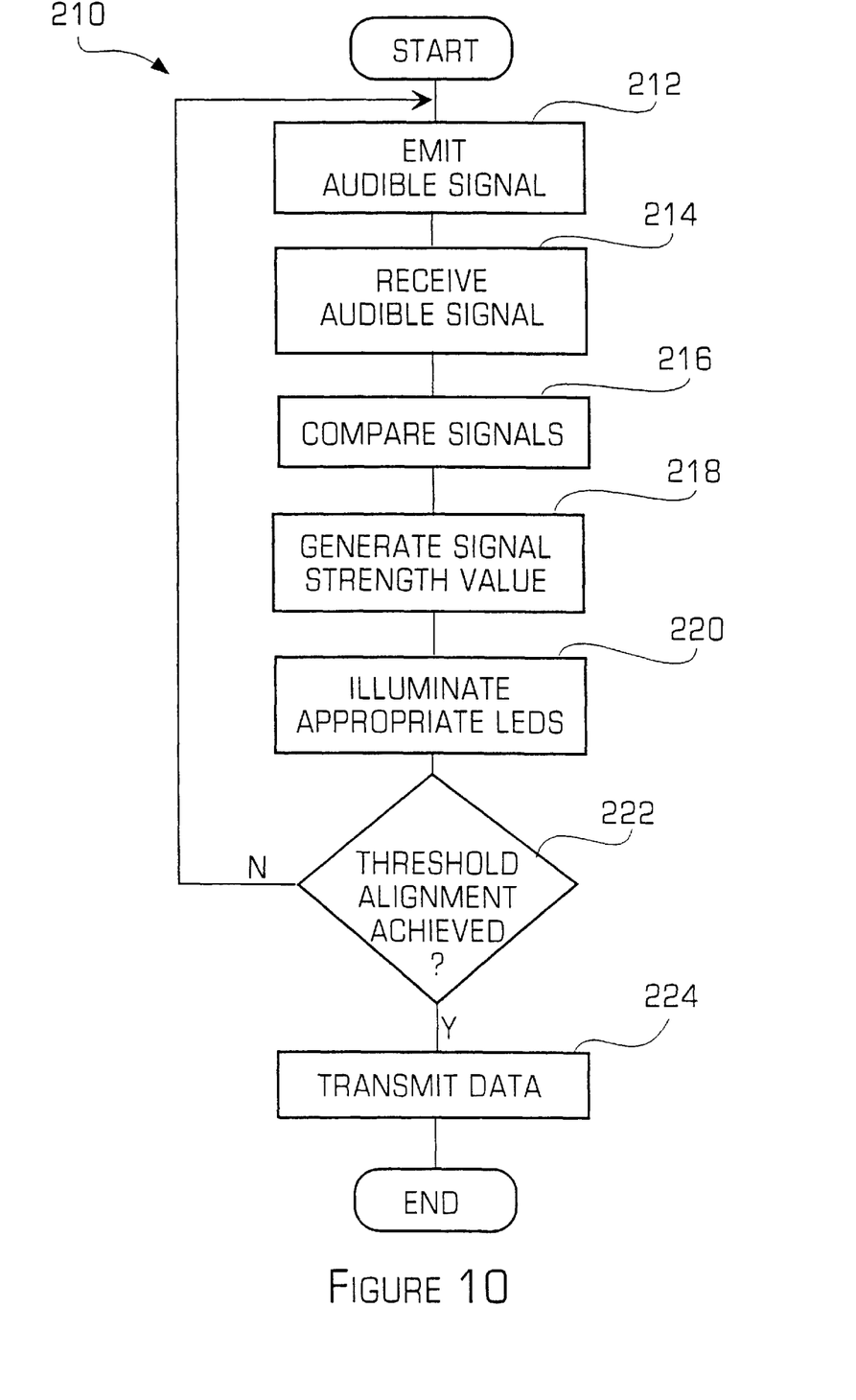
FIG. 10 is a flowchart illustrating a method for coupling a device to a telephone handset in accordance with the invention.

FIG. 10 is a flowchart illustrating a method 210 for automatically providing user feedback for coupling a handheld device to a telephone handset in accordance with the invention. For the purposes of this description, the technique using the sidetone signal will be described. First, the handheld device and the telephone handset are coupled to each other by the user. In step 212, the handheld device generates a known audible signal from its speaker and then in step 214, the microphone of the handheld device receives the signal due to the sidetone signal of the telephone handset, as described above. In step 216, the handheld device may compare the signals and generate a signal quality (e.g., strength) value in step 218. The signal quality value may be the SNR value of the received signal or the number of errors in the received signal since each of these values may be used to determine if the proper coupling of the handheld device and the telephone handset has been achieved. In step 220, an indication is given to the user about the coupling of the handheld device and the telephone handset. As described above, the indication may be either visual or audible. In step 222, the user of the handheld device determines if the proper coupling has been achieved based on the indicators and the method loops back to step 212 if additional adjustment is needed. If the coupling is proper, then the handheld device may start transmitting data in step 224 and the method is completed. The method permits the handheld device to automatically instruct the user as to how to properly align the handheld device with the telephone handset so that the user does not have to attempt to guess when a proper coupling has been obtained. Now, an example of the operation of the automatic coupling system and method in accordance with the invention will be described.

Figure 11:
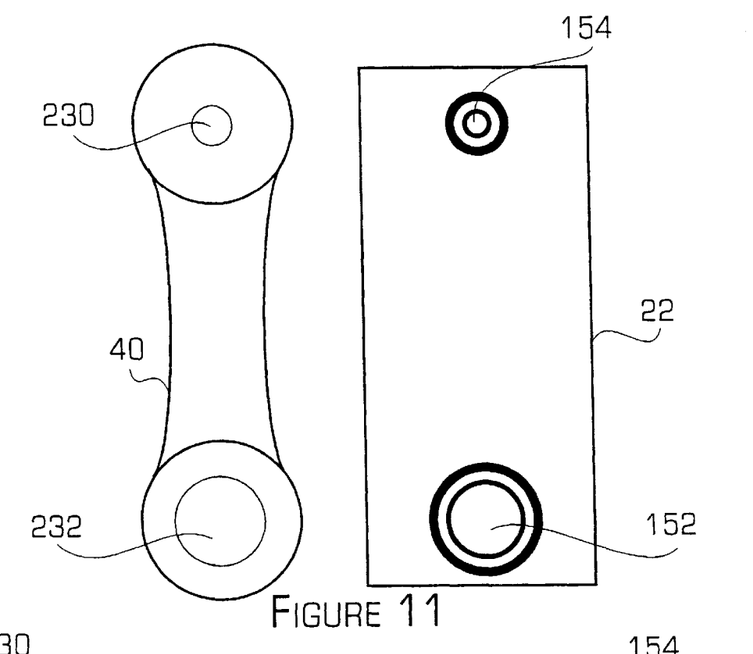
FIG. 11 is a diagram illustrating a typical telephone handset and the bottom of the handheld unit.
Figure 12A:
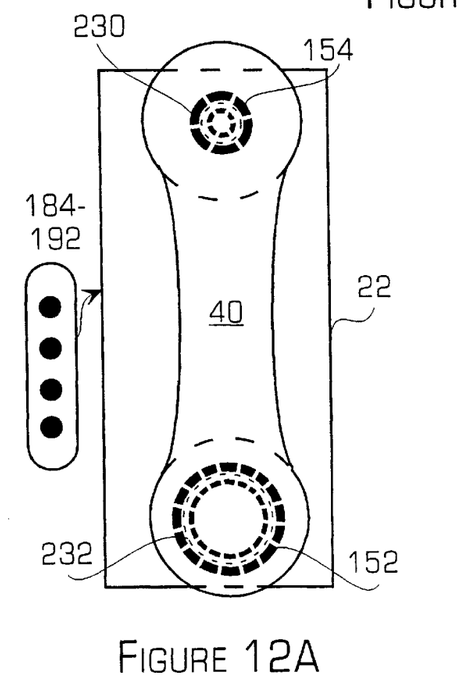
FIG. 12A is a diagram illustrating a proper aligned telephone handset and handheld device and the associated visual indicators on the handheld device.
Figure 12B:
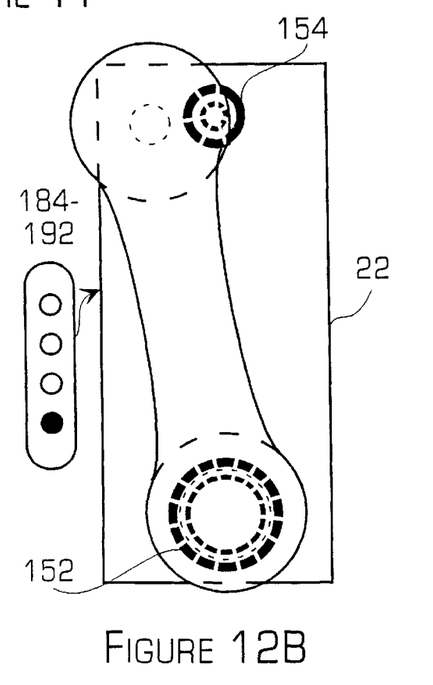
FIG. 12B is a diagram illustrating an improperly aligned telephone handset and handheld device and the associated visual indicators on the handheld device.

FIG. 11 is a diagram illustrating a bottom portion of the handheld device 22 and the telephone handset 40. The telephone handset may have a earpiece 230 which has a speaker and a mouthpiece 232 which includes a microphone. The handheld device, as described above, may have a speaker 152 that mates with the mouthpiece 232 and a microphone 154 which mates with the earpiece 230. FIGS. 12A and 12B illustrate a properly aligned handheld device and telephone handset and a misaligned handheld device and telephone handset, respectively. As shown in FIG. 12A, when the handheld device and the telephone handset are properly aligned, the speaker 152 of the handheld device covers the microphone of the mouthpiece 232 and the microphone 154 covers the speaker in the earpiece 230 of the telephone handset. When the handheld device and the telephone handset are properly aligned, as shown in FIG. 12A, the LEDs 184–192 on the handheld device may be, for example, all illuminated. As shown in FIG. 12B, when the handheld device and the telephone handset are not properly aligned, the microphone 154 of the handheld device may be misaligned with the speaker of the earpiece 230. When there is a misalignment problem, as shown in FIG. 12B, only one of the LEDs 184–192 on the handheld device, for example, may be illuminated indicating to the user that the handheld device needs to be moved in some manner to obtain a better coupling.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An electronic data communications device adapted for communicating via a mouthpiece and an earpiece, respectively, of a telephone handset, the device comprising:

a microphone that receives an audible signal;

a detector that generates a signal indicating the quality of the signal received by the microphone, the signal quality depending on the position and alignment of the microphone relative to the earpiece of the telephone handset; and an indicator which indicates to the user when a predetermined quality signal has been generated indicating that the speaker and microphone of the communications device are aligned with the mouthpiece and earpiece, respectively, of the telephone handset.

2. The device of claim 1 further comprising a speaker for generating the audible signal that is received by the microphone of the device by feeding the audible signal generated by the speaker through the telephone handset and back to the microphone.

3. The device of claim 2, wherein the generated audible signal is communicated over a sidetone signal associated with the telephone handset.

4. The device of claim 1 further comprising a speaker at a remote location generating the audible signal which is communicated to the device over a telephone system connected to the telephone handset.

5. The device of claim 1, wherein the signal quality signal comprises a signal to noise ratio value associated with the received signal.

6. The device of claim 1, wherein the detector comprises a counter which determines a number of errors in the received signal.

7. The device of claim 1, wherein the indicator provides a visual indication of the interface of the device and the telephone to the user.

8. The device of claim 7, wherein the indicator comprises one or more light emitting diodes associated with the device.

9. The device of claim 8, wherein the indicator further comprises means for illuminating the light emitting diodes when a proper interface has been obtained.

10. The device of claim 8, wherein the indicator further comprises means for flashing the light emitting diodes until a proper interface has been achieved.

11. The device of claim 8, wherein the indicator further comprises means for communicating electronic data once the proper interface has been achieved.

12. The device of claim 1, wherein the indicator provides an audible indication of the interface of the device and the telephone to the user.

13. The device of claims 12, wherein the indicator comprises an interface speaker for generating an audible signal indicating the interface of the device and the telephone handset.

14. The device of claim 1 further comprising means for generating a signal quality signal as the speaker and microphone of the device are moved relative to the mouthpiece and earpiece of the telephone handset and means for indicating the signal quality to the user so that the user may move the microphone and speaker of the device relative to the mouthpiece and earpiece of the telephone handset to achieve a predetermined signal quality.

15. A method for communicating using a communications device having a speaker and a microphone via a mouthpiece and an earpiece, respectively, of a telephone handset, the method comprising:

receiving an audible signal through the microphone of the communications device;

generating a signal indicating the quality of the signal received by the microphone; and indicating to the user when the interface of the speaker and microphone of the communications device and the mouthpiece and earpiece, respectively, of the telephone is such that the signal has a predetermined signal quality value indicating that communications may occur between the communications device and the telephone handset.

16. The method of claim 15 further comprising generating the audible signal by a speaker of the handheld device by feeding the audible signal generated by the speaker through the telephone handset and back to the microphone.

17. The method of claim 16 further comprising communicating the generated audible signal over a sidetone signal associated with the telephone handset.

18. The method of claim 15 further comprising generating the audible signal at a speaker at a remote location which is communicated to the device over a telephone system connected to the telephone handset.

19. The method of claim 15, wherein the signal quality signal comprises a signal to noise ratio value associated with the received signal.

20. The method of claim 15, wherein generating the signal quality signal comprises counting the number of errors in the received signal.

21. The method of claim 15, wherein indicating comprises providing a visual indication of the interface of the device and the telephone to the user.

22. The method of claim 21, wherein the indicating comprises using one or more light emitting diodes associated with the device.

23. The method of claim 22, wherein the indicating further comprises illuminating the light emitting diodes when a predetermined signal quality is achieved which indicates that a proper interface has been obtained between the device and the telephone handset.

24. The method of claim 22, wherein the indicating further comprises flashing the light emitting diodes until a proper interface has been achieved.

25. The method of claim 22, wherein the indicating further comprises communicating electronic data once the proper interface has been achieved.

26. The method of claim 15, wherein indicating comprises providing an audible indication of the interface of the device and the telephone to the user.

27. The method of claim 26, wherein the indicating comprises generating an audible signal to indicate the interface of the device and the telephone.

28. The method of claim 15 further comprising generating a signal quality signal as the speaker and microphone of the device are moved by the user relative to the mouthpiece and earpiece of the telephone handset and indicating the signal quality to the user so that the user may move the microphone and speaker of the device relative to the mouthpiece and earpiece of the telephone handset to achieve a predetermined signal quality.

29. A system for positioning a speaker and a microphone of a communications device with a mouthpiece and an earpiece, respectively, of a telephone handset, the system comprising:

means for receiving an audible signal;

means for detecting the audible signal;

means for generating a signal indicating the quality of the signal received by the receiver means, the signal quality depending on the positioning of the speaker and microphone of the device relative to the mouthpiece and earpiece, respectively, of the telephone handset; and means for indicating to the user when the interface of the communications device and the telephone handset generates a predetermined quality signal indicating that communications may occur between the communications device and the telephone handset.

30. The system of claim 29 further comprising means for generating the audible signal in the device that is received by the microphone of the device.

31. The system of claim 30 further comprising means for communicating the generated audible signal over a sidetone signal associated with the telephone handset.

32. The system of claim 29 further comprising means, at a remote location, for generating the audible signal which is communicated to the handheld device over a telephone system connected to the telephone handset.

33. The system of claim 29, wherein the signal quality generator means comprises means for determining a signal to noise ratio value associated with the received signal.

34. The system of claim 29, wherein the signal quality generator means comprises means for counting a number of errors in the received signal.

35. The system of claim 29, wherein the indicator means comprises means for providing a visual indication of the interface of the device and the telephone to the user.

36. The system claim 35, wherein the visual indicator comprises one or more light emitting diodes associated with the device.

37. The system of claim 36, wherein the indicator means further comprises means for illuminating the light emitting diodes when a proper interface has been obtained.

38. The system claim 36, wherein the indicator means further comprises means for flashing the light emitting diodes until a proper interface has been achieved.

39. The system of claim 36, wherein the indicator means further comprises means for communicating electronic data once the proper interface has been achieved.

40. The system claim 29, wherein the indicator means comprises means for providing an audible indication of the interface of the device and the telephone to the user.

41. The system of claim 40, wherein the indicator means comprises an interface speaker for generating an audible signal indicating the interface of the device and the telephone.

42. The system of claim 29 further comprising means for generating a signal quality signal as the speaker and microphone of the device are moved relative to the mouthpiece and earpiece of the telephone handset and means for indicating the signal quality to the user so that the user may move the microphone and speaker of the device relative to the mouthpiece and earpiece of the telephone handset to achieve a predetermined signal quality.

43. A method for coupling a communications device having a speaker and a microphone to a mouthpiece and an earpiece, respectively, of a telephone handset, the coupling method comprising:

positioning the speaker and microphone of the communications device adjacent to the mouthpiece and earpiece, respectively of the telephone handset;

receiving an audible signal through the microphone of the communications device;

generating a signal indicating the quality of the signal received through the microphone; and indicating to the user when the coupling of the speaker and microphone of the communications device and the mouthpiece and earpiece, respectively, of the telephone handset is such that the signal has a predetermined signal quality value indicating that communications may occur between the communications device and the telephone handset.

\* \* \* \* \*